(12) United States Patent
Gandhi et al.

(10) Patent No.: US 11,120,447 B2
(45) Date of Patent: Sep. 14, 2021

(54) AUTHORIZATION CONTROL NETWORK AND METHOD OF VALIDATING AN AUTHORIZATION REQUEST

(71) Applicant: THE TORONTO-DOMINION BANK, Toronto (CA)

(72) Inventors: Rajeev Kumar Gandhi, Mississauga (CA); Noemi Colmenar-Miranda, Toronto (CA); Danielle Marie Pinnock, Ajax (CA); William Joseph McLellan, Rodney (CA); Richard Titus Szvath, Mississauga (CA); Liliya Kaminskaya, Toronto (CA); Jennifer Amaral, Oakville (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

(21) Appl. No.: 16/593,579

(22) Filed: Oct. 4, 2019

(65) Prior Publication Data
US 2021/0103931 A1    Apr. 8, 2021

(51) Int. Cl.
*G06Q 40/02* (2012.01)
*G06Q 20/24* (2012.01)
*G06Q 20/40* (2012.01)
*G06Q 20/34* (2012.01)
*G06F 16/16* (2019.01)

(52) U.S. Cl.
CPC ............ *G06Q 20/40* (2013.01); *G06Q 20/24* (2013.01); *G06Q 20/354* (2013.01); *G06Q 20/4093* (2013.01); *G06Q 40/02* (2013.01); *G06Q 40/025* (2013.01); *G06F 16/162* (2019.01)

(58) Field of Classification Search
CPC . G06Q 20/24; G06Q 20/40; G06Q 40/02–025
See application file for complete search history.

(56) References Cited

U.S. PATENT DOCUMENTS

| 5,708,422 | A | * | 1/1998 | Blonder | G06Q 20/40 340/5.41 |
| 5,914,472 | A | * | 6/1999 | Foladare | G06Q 20/4037 235/380 |
| 7,249,092 | B2 | * | 7/2007 | Dunn | G06Q 20/04 705/38 |

(Continued)

*Primary Examiner* — Christle I Marshall
(74) *Attorney, Agent, or Firm* — Graham Patent Law (57) ABSTRACT

An authorization control network includes an attribute control server and an authorization server. The attribute control server is configured to receive from a communications device a credential and a modification request that includes an account identifier, determine a cardholder attribute from the credential, determine an account attribute associated with the account identifier in a card profile database, determine that the cardholder attribute matches the account attribute, and transmit the modification request to the authorization server. The authorization server is configured to update a limit value with the account identifier in a limit profile database, receive from a POS device an authorization request that includes the account identifier and an authorization value, determine the limit value associated with the account identifier in the limit profile database, generate an authorization response indicating whether the authorization value exceeds the limit value, and transmit the authorization response to the POS device.

16 Claims, 6 Drawing Sheets

(56) References Cited

U.S. PATENT DOCUMENTS

| | | | |
|---|---|---|---|
| 7,359,880 B2 | 4/2008 | Abel et al. | |
| 8,768,801 B1* | 7/2014 | Cheatham | G06Q 40/02 |
| | | | 705/35 |
| 2002/0099635 A1 | 7/2002 | Guiragosian et al. | |
| 2003/0208439 A1* | 11/2003 | Rast | G06Q 20/403 |
| | | | 705/38 |
| 2007/0294164 A1* | 12/2007 | Wilhelm | G06Q 40/025 |
| | | | 705/38 |
| 2012/0265681 A1* | 10/2012 | Ross | G06Q 40/02 |
| | | | 705/44 |
| 2016/0358250 A1* | 12/2016 | Dogin | G06Q 40/025 |
| 2019/0156313 A1 | 5/2019 | Persaud et al. | |

* cited by examiner

AUTHORIZATION CONTROL NETWORK AND METHOD OF VALIDATING AN AUTHORIZATION REQUEST

FIELD

This patent application relates to a network and method of validating an authorization request.

BACKGROUND

A payment card issuer may provide its customers (cardholders) with payment cards, and the payment card issuer may associate a maximum credit limit value with each payment card, limiting the maximum credit available to cardholders for transactions initiated using their respective payment cards. Therefore, the card issuer may authorize an authorization request received from a point-of-sale (POS) device if the authorization value included in the authorization request does not exceed the maximum credit limit value or if particulars (e.g. merchant, jurisdiction of transaction) of the transaction do not violate fraud threshold parameters implemented by the card issuer.

SUMMARY

This patent application describes an authorization control network, a non-transitory computer-readable medium and an associated method in which an authorization server receives an authorization request that includes an account identifier and an authorization value and determines whether the authorization value exceeds a per-transaction limit value associated with the account identifier, and an attribute control server provides restricted access to changes to the per-transaction limit value.

In accordance with a first aspect of this disclosure, there is provided an authorization control network that includes an attribute control server and an authorization server.

The attribute control server includes a first network interface and a first data processing unit. The first data processing unit is in communication with a card profile database. The card profile database includes at least one record, and one of the records stores an account attribute in association with an account identifier.

The authorization server includes a second network interface and a second data processing unit. The second data processing unit is in communication with a limit profile database. The limit profile database includes at least one limit profile, and one of the limit profiles stores a current per-transaction limit value in association with the account identifier.

The attribute control server is configured to receive a cardholder credential and a modification request from a communications device via the first network interface. The modification request includes the account identifier.

The attribute control server is configured to (i) determine a cardholder attribute from the cardholder credential, (ii) determine the account attribute by querying the card profile database with the account identifier, and (iii) validate the modification request by determining whether the cardholder attribute matches the account attribute. The attribute control server is also configured to transmit the modification request to the authorization server via the first network interface, in accordance with an outcome of the validation. The authorization server is configured to update the limit profile database with the modification request.

The authorization server is further configured to (i) receive from a point-of-sale device, via the second network interface, an authorization request that includes the account identifier and an authorization value, (ii) determine the current per-transaction limit value associated with the account identifier by querying the limit profile database with the account identifier, (iii) generate an authorization response indicating whether the authorization value exceeds the current limit value, and (iv) transmit the authorization response to the point-of-sale device via the second network interface.

In accordance with a second aspect of this disclosure, there is provided a method of validating an authorization request that involves at least one computer server receiving a cardholder credential and a modification request from a communications device. The modification request includes an account identifier.

The method involves the at least one computer server (i) determining a cardholder attribute from the cardholder credential, (ii) determining an account attribute by querying a card profile database with the account identifier, and (iii) validating the modification request by determining whether the cardholder attribute matches the account attribute. The card profile database includes at least one record, and one of the records stores the account attribute in association with the account identifier.

The method also involves the at least one computer server updating a limit profile database with the modification request, in accordance with an outcome of the validating. The limit profile database includes at least one limit profile, and one of the limit profiles stores a current per-transaction limit value in association with the account identifier.

The method further involves the at least one computer server (i) receiving from a point-of-sale device an authorization request that includes the account identifier and an authorization amount, (ii) determining the current per-transaction limit value associated with the account identifier by querying the limit profile database with the account identifier, (iii) generating an authorization response that indicates whether the authorization amount exceeds the current limit value, and (iv) transmitting the authorization response to the point-of-sale device.

In accordance with a third aspect of this disclosure, there is provided a non-transitory computer-readable medium that includes computer processing instructions which, when executed by a processor of a computer server, cause the computer server to receive a cardholder credential and a modification request from a communications device. The modification request includes an account identifier.

The computer processing instructions cause the computer server to (i) determine a cardholder attribute from the cardholder credential, (ii) determine an account attribute by querying a card profile database with the account identifier, and (iii) validate the modification request by determining whether the cardholder attribute matches the account attribute. The card profile database includes at least one record, and one of the records stores the account attribute in association with the account identifier.

The computer processing instructions also cause the computer server to update a limit profile database with the modification request, in accordance with an outcome of the validating. The limit profile database includes at least one limit profile, and one of the limit profiles stores a current per-transaction limit value in association with the account identifier.

The computer processing instructions further cause the computer server to (i) receive from a point-of-sale device an authorization request that includes the account identifier and an authorization value, (ii) determine the current per-transaction limit value associated with the account identifier by querying the limit profile database with the account identifier, (iii) generate an authorization response that indicates whether the authorization value exceeds the current limit value, and (iv) transmit the authorization response to the point-of-sale device.

In one implementation, the attribute control server determines the cardholder attribute by transmitting the cardholder credential to the authorization server, and the authorization server (i) determines the cardholder attribute by querying a cardholder database with the cardholder credential, and (ii) transmits the cardholder attribute to the attribute control server. The cardholder database may include at least one record, and one of the records of the cardholder database may store the cardholder attribute and the account identifier in association with the cardholder credential.

In one implementation, the attribute control server receives a service initiation request from the communications device, and transmits the cardholder credential to the authorization server. The authorization server determines the account identifier and the account attribute by querying an account profile database with the cardholder credential. The account profile database includes at least one record. One of the records of the account profile database stores the account identifier and the account attribute in association with the cardholder credential.

The authorization server then transmits the account identifier and the account attribute to the attribute control server. The attribute control server saves the account identifier and the account attribute in the one record of the card profile database.

The modification request may include an updated per-transaction limit value. In this scenario, the attribute control server may validate the modification request by confirming that the cardholder attribute matches the account attribute, and the authorization server may update the limit profile database by saving the updated limit value in the one limit profile in association with the account identifier in replacement of the current limit value. Alternately, the attribute control server may confirm that the cardholder attribute does not match the account attribute, and the authorization server may maintain the current limit value in the one limit profile in association with the account identifier.

Alternately, the modification request may include a cancellation request. In this scenario, the attribute control server may validate the modification request by confirming that the cardholder attribute matches the account attribute, and the authorization server may purge the one limit profile from the limit profile database. The attribute control server may also purge the one account profile from the account profiles database. Alternately, the attribute control server may confirm that the cardholder attribute does not match the account attribute, and the authorization server may maintain the one limit profile in the limit profile database.

Since, in accordance with the foregoing aspects of the disclosure, the authorization server updates the limit profile database (i.e. updates the per-transaction limit value in the one limit profile or purges the limit profile from the limit profile database) only after the attribute control server confirms that the cardholder attribute matches the account attribute (i.e. the cardholder requesting the change to the limit profile also caused the one limit profile to be saved in the limit profile database), the security of the technological process of updating the limit profile database is improved in comparison to the state of the art.

BRIEF DESCRIPTION OF THE DRAWINGS

An exemplary authorization control network and method of validating an authorization request will now be described, with reference to the accompanying drawings, in which.

DETAILED DESCRIPTION

Authorization Control Network—Overview

Figure 1:
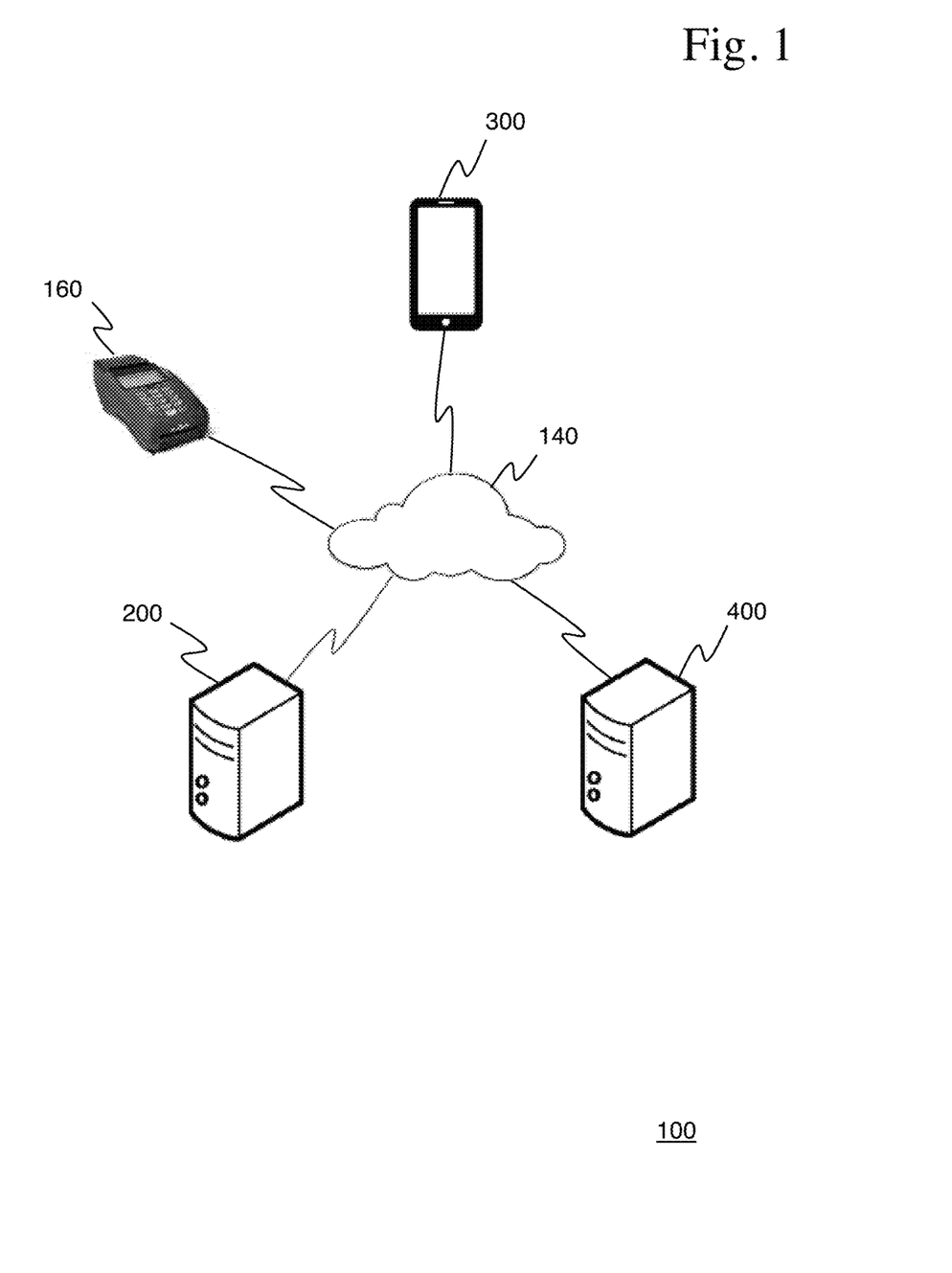
FIG. 1 is a schematic view of an exemplary authorization control network, depicting a point-of-sale device, an authorization server, a personal communications device, and an attribute control server.

FIG. 1 is a schematic view of an authorization control network, denoted generally as 100. As shown, the authorization control network 100 includes a point-of-sale (POS) device 160, an authorization server 200, a personal communications device 300, and an attribute control server 400.

The POS device 160 is typically deployed at a merchant's business premises, and is configured to communicate with the authorization server 200 via a wide area network 140. The POS device 160 may be implemented as an integrated point-of-sale (POS) terminal or as a semi-integrated point-of-sale (POS) terminal, and includes a payment card interface that is configured to communicate with a payment card (e.g. credit card, debit card) that may be interfaced with the POS device 160.

The authorization server 200 may be associated with a financial institution ("cardholder financial institution"), and is configured to communicate with the POS device 160 and the attribute control server 400 via the wide area network 140. As will be discussed in greater detail, the authorization server 200 may maintain (or be in communication with) at least a transactions database that stores particulars of financial transactions initiated using payment cards assigned to respective cardholders, and a limit profile database that stores, for each payment card, a maximum per-transaction limit value for each financial transaction. The authorization server 200 also implements a limit control service that declines authorization for a transaction if the authorization value for the transaction exceeds the specified maximum limit value.

The attribute control server 400 may be associated with a financial institution ("merchant financial institution"), and is configured to communicate with the personal communications device 300 and the authorization server 200 via the wide area network 140. As will be discussed in greater detail, the attribute control server 400 may maintain (or be in communication with) at least a card profile database 416 that indicates, for each payment card, whether the payment card was enrolled in the limit control service by the primary cardholder or the authorized user. The attribute control server 400 also implements an attribute control service that allows a cardholder to modify the maximum per-transaction limit value (or remove a payment card from the limit control service) only if that cardholder enrolled the payment card in the limit control service.

Although the authorization server 200 and the attribute control server 400 are depicted as distinct computer servers in FIG. 1, all or part of the functionality implemented by the attribute control server 400 may instead be implemented by the authorization server 200.

The wide area network 140 may include a wired communications network and a mobile communications network. The wired communications network is configured for the transmission of data across a physical transmission medium. As an example, the wired communications network may be IEEE 802.3 (i.e. Ethernet)-compliant.

The mobile communications network is configured for the transmission of data across a wireless transmission medium. As an example, the mobile communications network may be LTE, WiMax, UMTS, CDMA and/or GSM-compliant.

The mobile communications network typically includes at least one wireless base station subsystem (not shown) that may communicate with the personal communications device 300 via a wireless link (where the personal communications device 300 is implemented as a wireless communications device), and may act as a bridge between the wireless links and the wired communications network.

The wide area network 140 also includes a payment network (e.g. VisaNet®, the Mastercard® Network, the Interac® Network) over which confidential payment information (e.g. payment card account numbers, payment card expiry dates) may be securely transmitted between the POS device 160 and the authorization server 200.

Authorization Server

Figure 2:
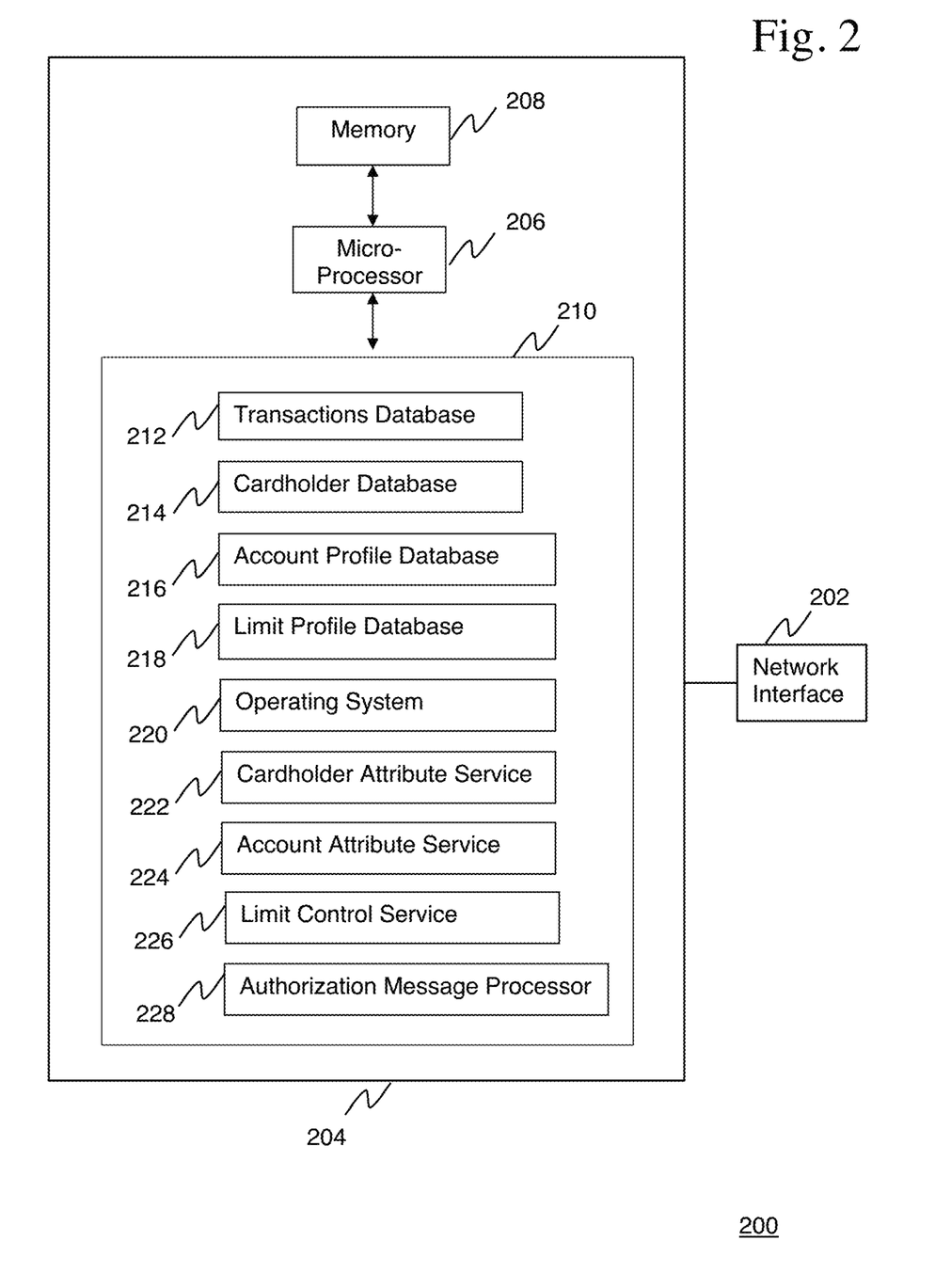
FIG. 2 is a schematic view of the authorization server.

The authorization server 200 is implemented as a computer server. As shown in FIG. 2, the authorization server 200 includes a network interface 202, and a data processing system 204 that is in communication with the network interface 202. The network interface 202 interfaces the authorization server 200 with the wide area network 140, and allows the authorization server 200 to communicate with the POS device 160 and the attribute control server 400 via the wide area network 140.

The data processing system 204 includes one or more microprocessors 206, a volatile computer-readable memory 208 and a non-volatile computer-readable memory 210. The computer-readable memory 210 may be provided as one or more of a magnetic storage drive and a solid-state drive, and may store a transactions database 212, cardholder database 214, an account profile database 216, and a limit profile database 218. Alternately, the data processing system 204 may be in communication with the transactions database 212, the cardholder database 214, the account profile database 216 and/or the limit profile database 218 (e.g. via the network interface 202).

The cardholder financial institution may provide (or may authorize a third party to provide) payment cards to customers ("cardholders") of the cardholder financial institution. Each payment card is configured/encoded with at least a respective account identifier (primary account number or "PAN"). The transactions database 212 includes a plurality of ledgers each associated with a respective one of the transaction account. Each ledger of the transactions database 212 identifies the account identifier of one of the payment cards, particulars (e.g. merchant identifier, authorization amount) of financial transactions initiated using the payment card, and the credit (if any) available using the transaction account.

The cardholder database 214 includes a plurality of records each associated with a respective cardholder. A subset of the cardholders may be related (e.g. family members), and one of the cardholders ("primary cardholder") of a cardholder subset may have primarily liability to the cardholder financial institution for effecting payment to the cardholder financial institution for all financial transactions initiated using the payment card assigned to the primary cardholder. The primary cardholder may also have primarily liability to the cardholder financial institution for effecting payment to the cardholder financial institution for all financial transactions initiated using the payment cards assigned to the other cardholders ("authorized users", or "secondary cardholders") of the cardholder subset. Therefore, each record of the cardholder database 214 includes a cardholder credential (e.g. userID) that is uniquely associated with the cardholder, and a cardholder attribute field that indicates whether the cardholder is a primary cardholder or an authorized user.

The account profile database 216 includes a plurality of records each associated with a respective transaction account. Each record of the account profile database 216 includes an account identifier of the associated transaction account, a primary cardholder field and an authorized user field. The primary cardholder field identifies the cardholder credential of the primary cardholder associated with the account identifier. The authorized user field identifies the cardholder credential of the authorized user (if any) associated with the account identifier.

The limit profile database 218 includes a plurality of records each associated with a respective limit profile. Each limit profile of the limit profile database 218 identifies at least an account identifier that is uniquely associated with the respective limit profile, and a per-transaction limit value that is associated with the account identifier.

The non-volatile computer-readable memory 210 may also store computer processing instructions which, when copied into the volatile computer-readable memory 208, and executed by the microprocessor(s) 206 from the volatile computer-readable memory 208, implement at least an operating system 220, a cardholder attribute service 222, an account attribute service 224, a limit control service 226, and an authorization message processor 228.

The operating system 220 allows the authorization server 200 to at least communicate with the POS device 160 and the attribute control server 400 (via the network interface 202).

The cardholder attribute service 222 is configured to (i) receive a cardholder credential from the attribute control server 400 (via the network interface 202); (ii) determine the cardholder attribute (from the cardholder attribute field) by querying the cardholder database 214 with the cardholder credential; and (iii) transmit the cardholder attribute to the attribute control server 400 (via the network interface 202).

The account attribute service 224 is configured to (i) receive a cardholder credential from the attribute control server 400 (via the network interface 202); (ii) locate all the account identifiers associated with the cardholder credential in the account profile database 216 by querying the primary cardholder field and the authorized user field of the account profile database 216 with the cardholder credential; (iii) generate an account table that includes the located account identifier(s) and identifies, for each located account identifier, the associated authorized user (if any); and (iv) transmit the account table to the attribute control server 400 (via the network interface 202).

The limit control service 226 is configured to (i) receive from the attribute control server 400, via the network interface 202, a modification request that includes at least an account identifier; and (Ii) update the limit profile database 218 with the modification request.

For example, the modification request may be provided as an initialization request message that includes a new per-transaction limit value and the account identifier, and the limit control service 226 may be configured to update the limit profile database 218 by confirming that the limit profile database 218 does not include a limit profile that is associated with the account identifier, creating in the limit profile database 218 a new limit profile that includes the account identifier, and saving the new per-transaction limit value in the new limit profile in association with the account identifier.

The modification request may be provided as an update request message that includes an updated per-transaction limit value and the account identifier, and the limit control service 226 may be configured to update the limit profile database 218 by locating the limit profile that is associated with the account identifier in the limit profile database 218, and replacing the current per-transaction limit value in the located limit profile by saving the updated per-transaction limit value in the located limit profile in association with the account identifier.

Alternately, the modification request may be provided as a cancellation request message that includes the account identifier, and the limit control service 226 may be configured to update the limit profile database 218 by locating the limit profile that is associated with the account identifier in the limit profile database 218, and purging the located limit profile from the limit profile database 218.

The authorization message processor 228 is configured to (i) receive from the POS device 160, via the network interface 202, an authorization request that includes an account identifier and an authorization value; (ii) determine the per-transaction limit value associated with the account identifier by querying the limit profile database 218 with the account identifier; (iii) generate an authorization response indicating whether the authorization value exceeds the per-transaction limit value; and (iv) transmit the authorization response to the POS device 160 via the network interface 202.

The authorization response may also indicate whether the total credit available in the transaction account associated with the account identifier is at least equal to the authorization value. Therefore, the authorization message processor 228 may generate the authorization response by also determining whether the authorization value of a financial transaction that is initiated using a payment card exceeds the total credit (if any) available using the associated transaction account.

Personal Communications Device

Figure 3:
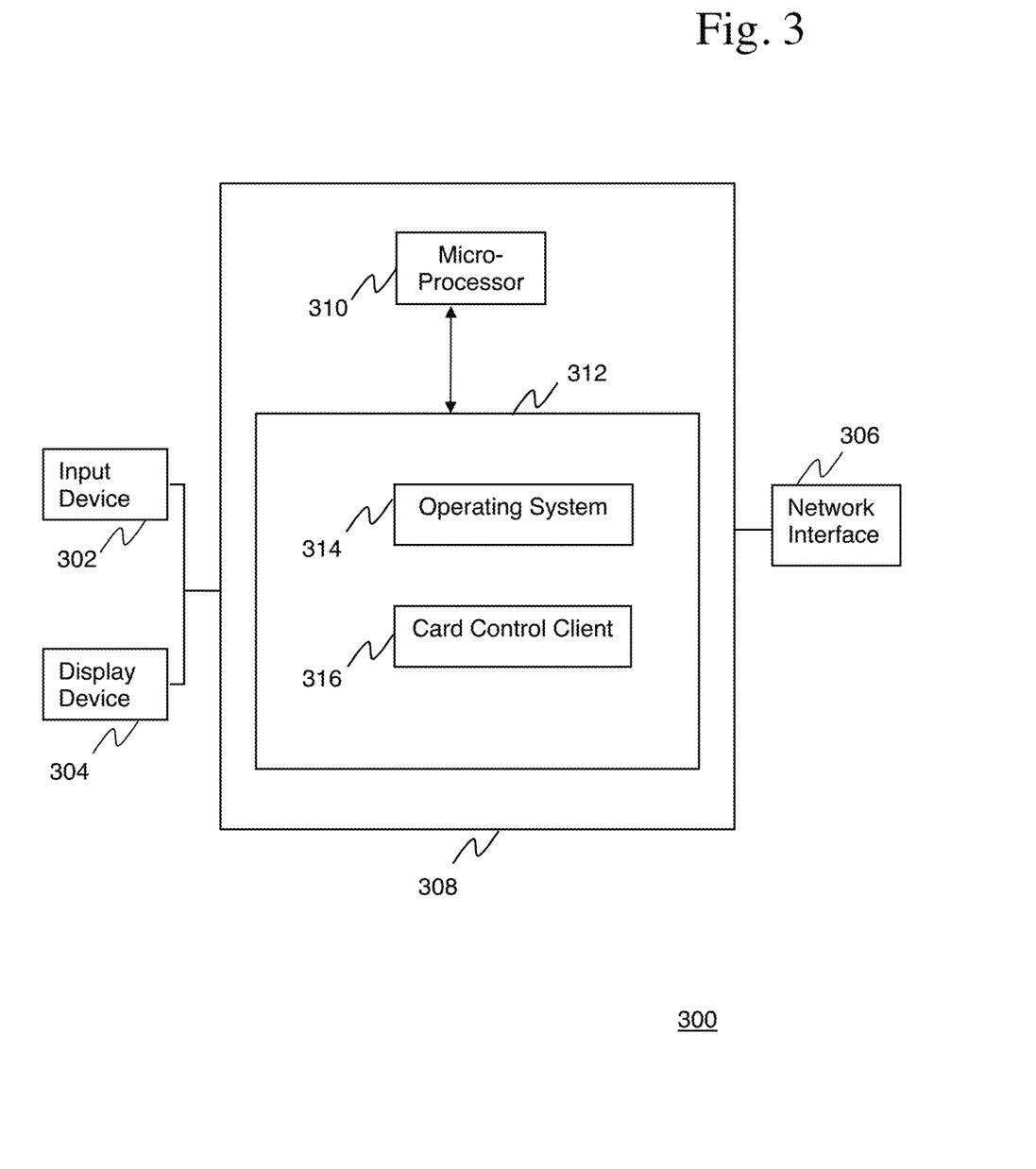
FIG. 3 is a schematic view of the personal communications device.

The personal communications device 300 may be implemented as a wireless communications device, such as a portable digital assistant (PDA), a tablet computer or a smartphone. Alternately, the personal communications device 300 may be implemented as a wired communications device, such as a portable computer or a desktop computer.

As shown in FIG. 3, the personal communications device 300 may include an input device 302, a display device 304, a network interface 306, and a data processing system 308 that is in communication with the input device 302, the display device 304, and the network interface 306.

The input device 302 may be implemented as a keyboard, touchpad, touchscreen or other input device suitable for allowing the operator to input data and/or commands into the personal communications device 300. The display device 304 may be implemented as a liquid crystal display (LCD) panel, plasma display panel, or other display device suitable for displaying information to the operator of the personal communications device 300.

The network interface 306 interfaces the personal communications device 300 with the wide area network 140, and allows the personal communications device 300 to communicate with at least the attribute control server 400 via the wide area network 140.

The data processing system 308 includes a microprocessor 310 and a non-transient computer-readable memory 312. The computer-readable memory 312 may be provided as a FLASH memory, as an example. The computer-readable memory 312 may store computer processing instructions which, when accessed from the memory 312 and executed by the microprocessor 310, implement at least an operating system 314, and a card control client 316.

The operating system 314 allows the personal communications device 300 to accept user input from the input device 302 and to display information on the display device 304. The operating system 314 also allows the personal communications device 300 to communicate with the attribute control server 400 via the network interface 306.

The card control client 316 is configured to (i) transmit a cardholder credential to the attribute control server 400 (via the network interface 306); (ii) receive from the attribute control server 400 (via the network interface 306) the cardholder attribute that is associated with the cardholder credential in the cardholder database 214; (iii) receive an account table from the attribute control server 400 (via the network interface 306); and (iv) save the cardholder attribute and the account table in the memory 312. The account table includes the account identifier(s) associated with the cardholder credential in the account profile database 216 and identifies, for each account identifier, the associated authorized user (if any).

The card control client 316 is configured to (i) display the received account identifier(s) on the display device 304; (ii) receive from the input device 302 a user selection of one of the account identifier(s) that are displayed on the display device 304; (iii) transmit to the attribute control server 400 (via the network interface 306) a modification request that includes at least the selected account identifier.

If the received cardholder attribute indicates that the cardholder is a primary cardholder, the card control client 316 is configured to prominently render, on the display device 304 (using, for example, bold-faced text), all of the account identifier(s) included in the account table. Therefore, if the cardholder is a primary cardholder, the display device 304 prominently displays the account identifier(s) of the payment card(s) assigned to the primary cardholder, and the account identifier(s) of the payment cards assigned to the authorized user(s) of the primary cardholder's cardholder subset.

Conversely, if the received cardholder attribute indicates that the cardholder is an authorized user, the card control client 316 is configured to (i) locate the account identifier(s) of the payment card(s) assigned to that authorized user by querying the authorized user field of the account table with the cardholder credential of the authorized user, (ii) prominently render the located account identifier(s) on the display device 304 (using, for example, a bold-faced text), and (iii) less prominently render on the display device 304 all the other account identifier(s) included in the account table. Therefore, if the cardholder is an authorized user, the display device 304 prominently displays the account identifier(s) of the payment card(s) assigned to the authorized user, and "greys out" the account identifier(s) of the payment cards assigned to the primary cardholder and all other authorized users of the primary cardholder's cardholder subset.

As discussed, the modification request may be an initialization (or update) request message that includes a per-transaction limit value and the selected account identifier, and the authorization server 200 may receive the initialization (or update) request message from the attribute control server 400 and may be configured to respond to the initialization (or update) request message by saving the per-transaction limit value in the limit profile database 218 in association with the account identifier. Alternately, the modification request may be a cancellation request message that includes the selected account identifier, and the authorization server 200 may receive the cancellation request message from the attribute control server 400 and may be configured to respond to the cancellation request message by purging the account identifier and the associated limit value from the limit profile database 218.

As will be explained, an account identifier prominently displayed on the display device 304 indicates that the attribute control server 400 will accept a modification request in regards to any such account identifier. Conversely, an account identifier that is not prominently displayed on the display device 304 (e.g. displayed using "greyed-out text") indicates that the attribute control server 400 will not accept a modification request in regards to any such latter account identifier.

Attribute Control Server

Figure 4:
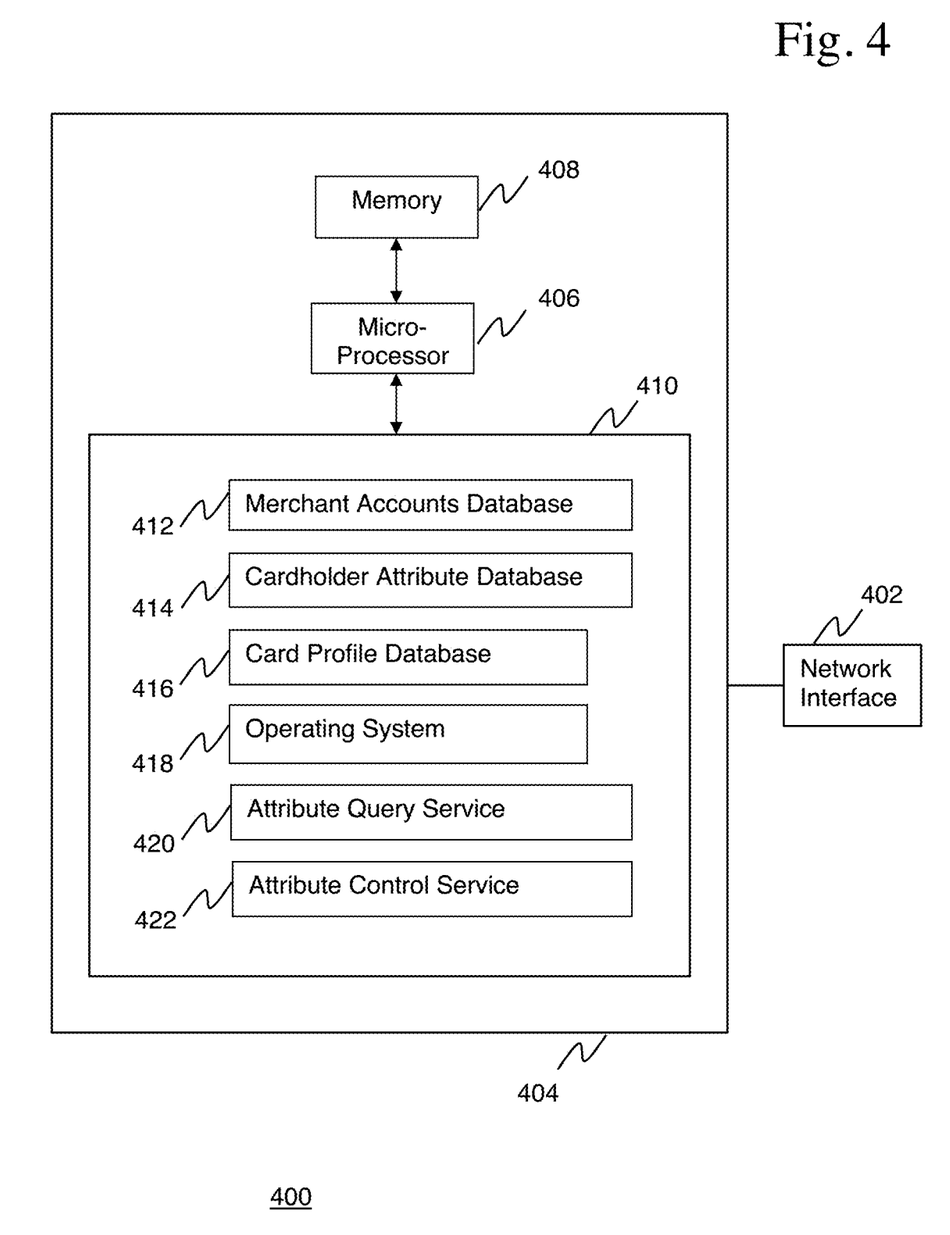
FIG. 4 is a schematic view of the attribute control server.

The attribute control server 400 is implemented as a computer server. As shown in FIG. 4, the attribute control server 400 includes a network interface 402, and a data processing system 404 that is in communication with the network interface 402. The network interface 402 interfaces the attribute control server 400 with the wide area network 140, and allows the attribute control server 400 to communicate with the POS device 160 and the attribute control server 400 via the wide area network 140.

The data processing system 404 includes one or more microprocessors 406, a volatile computer-readable memory 408 and a non-volatile computer-readable memory 410. The computer-readable memory 410 may be provided as one or more of a magnetic storage drive and a solid-state drive, and may store a merchant accounts database 412, a cardholder attribute database 414, and a card profile database 416. Alternately, the data processing system 404 may be in communication with the merchant accounts database 412, the cardholder attribute database 414 and/or the card profile database 416 (e.g. via the network interface 402).

The merchant accounts database 412 includes a plurality of ledgers each associated with a respective account of a merchant customer ("merchant account") of the merchant financial institution. Each ledger of the merchant accounts database 412 identifies an account number that is uniquely associated with the respective merchant account, and particulars of various payments made to the merchant account.

The cardholder attribute database 414 includes a plurality of records each associated with a respective cardholder. Each record of the cardholder attribute database 414 includes a cardholder credential that is uniquely associated with the cardholder, and a cardholder attribute field that indicates whether the associated cardholder is a primary cardholder or an authorized user.

The card profile database 416 includes a plurality of records each associated with a respective account identifier. As discussed above, the card control client 316 is configured to transmit to the attribute control server 400 an initialization (or update) request message that includes a per-transaction limit value and a user-selected account identifier, and the authorization server 200 may receive the initialization (or update) request message from the attribute control server 400 and may be configured to respond to the initialization (or update) request message by saving the limit value in the limit profile database 218 in association with the account identifier. Each record of the card profile database 416 includes an account identifier, and an account attribute field that indicates whether the associated account identifier was caused to be saved in the limit profile database 218 by the primary cardholder or the authorized user (if any).

The non-volatile computer-readable memory 410 may also store computer processing instructions which, when copied into the volatile computer-readable memory 408, and executed by the microprocessor(s) 406 from the volatile computer-readable memory 408, implement at least an operating system 418, an attribute query service 420 and an attribute control service 422.

The operating system 418 allows the attribute control server 400 to at least communicate with the POS device 160 and the attribute control server 400 (via the network interface 402).

As discussed, the cardholder attribute service 222 is configured to (i) receive a cardholder credential from the attribute control server 400; and (ii) transmit to the attribute control server 400 the cardholder attribute that is associated with the cardholder credential in the cardholder database 214. Further, the account attribute service 224 is configured to (i) receive a cardholder credential from the attribute control server 400; and (ii) transmit to the attribute control server 400 an account table that includes all the account identifiers associated with the cardholder credential in the account profile database 216 and the respective associated authorized users (if any). Therefore, the attribute query service 420 may receive from the personal communications device 300 a service initiation request that includes the cardholder credential. The attribute query service 420 is configured to respond to the service initiation request by (i) transmitting the cardholder credential to the authorization server 200, via the network interface 402, prior to receiving the modification request from the communications device; (ii) receiving from the authorization server 200, via the network interface 402, a cardholder attribute that indicates whether the associated cardholder is a primary cardholder or an authorized user; (iii) receiving from the authorization server 200, via the network interface 402, an account table that includes the account identifier(s) associated with the cardholder attribute and, for each account identifier, identifies the associated authorized user (if any); and (iv) saving the cardholder attribute in the cardholder attribute database 414 in association with the cardholder credential. The attribute query service 420 may also transmit the cardholder attribute and the account table to the personal communications device 300, via the network interface 402.

The attribute control service 422 is configured to (i) receive from the personal communications device 300, via the network interface 402, a modification request that includes at least an account identifier; (ii) determine a cardholder attribute from the cardholder credential; (iii) determine an account attribute from the account identifier; (iv) validate the modification request by determining whether the cardholder attribute matches the account attribute; and (v) in accordance with an outcome of the validating, transmit the modification request to the authorization server 200 via the network interface 402.

The attribute control service 422 is configured to determine the cardholder attribute by querying the cardholder attribute database 414 with the received cardholder credential. The attribute control service 422 is configured to determine the account attribute by locating, in the card profile database 416, a record that includes the account identifier (included in the modification request), and extracting the account attribute from the account attribute field of the located record. The attribute control service 422 is also configured to validate the modification request by confirming that the cardholder attribute (saved in the cardholder attribute database 414) matches the account attribute extracted from the card profile database 416.

As discussed, the limit control service 226 is configured to (i) receive from the attribute control server 400, via the network interface 202, a modification request that includes at least an account identifier; and (ii) update the limit profile database 218 with the modification request (e.g. save the account identifier in a limit profile in the limit profile database 218). The attribute control service 422 is configured to transmit the modification request to the authorization server 200 if the card profile database 416 does not have a record that includes the account identifier (i.e. the account identifier has not yet been saved in the limit profile database 218, or the account identifier has been purged from the limit profile database 218).

The attribute control service 422 is also configured to transmit the modification request to the authorization server 200 if the cardholder attribute matches the account attribute. Therefore, in effect, the attribute control service 422 transmits a (subsequent) modification request (e.g. including an update request message or a cancellation request message) to the authorization server 200 if the cardholder is a primary cardholder, and the account identifier was caused to be saved in the limit profile database 218 by the primary cardholder (or the cardholder is an authorized user, and the account identifier was caused to be saved in the limit profile database 218 by the authorized user). In this scenario, the attribute control service 422 is also configured to purge, from the card profile database 416, the record that includes the account identifier, if the modification request includes a cancellation request message.

Conversely, the attribute control service 422 is also configured to ignore a (subsequent) modification request if the cardholder attribute does not match the account attribute. Therefore, in effect, the attribute control service 422 does not transmit a (subsequent) modification request (e.g. including an update request message or a cancellation request message) to the authorization server 200 if the cardholder is a primary cardholder, and the account identifier was caused to be saved in the limit profile database 218 by the authorized user (or the cardholder is an authorized user, and the account identifier was caused to be saved in the limit profile database 218 by the primary cardholder). In this scenario, since the limit control service 226 does not receive the modification request, the limit control service 226 maintains the associated limit profile unchanged.

Method of Discounting an Authorization Value

As discussed, the authorization control network 100 implements a method of validating an authorization request. A sample embodiment of the method will be discussed with reference to FIGS. 5A and 5B. As will be explained, in this embodiment, at least one computer server (e.g. the authorization server 200, the attribute control server 400) receives a cardholder credential and a modification request from a communications device (e.g. the personal communications device 300). The modification request includes an account identifier.

Figure 5A:
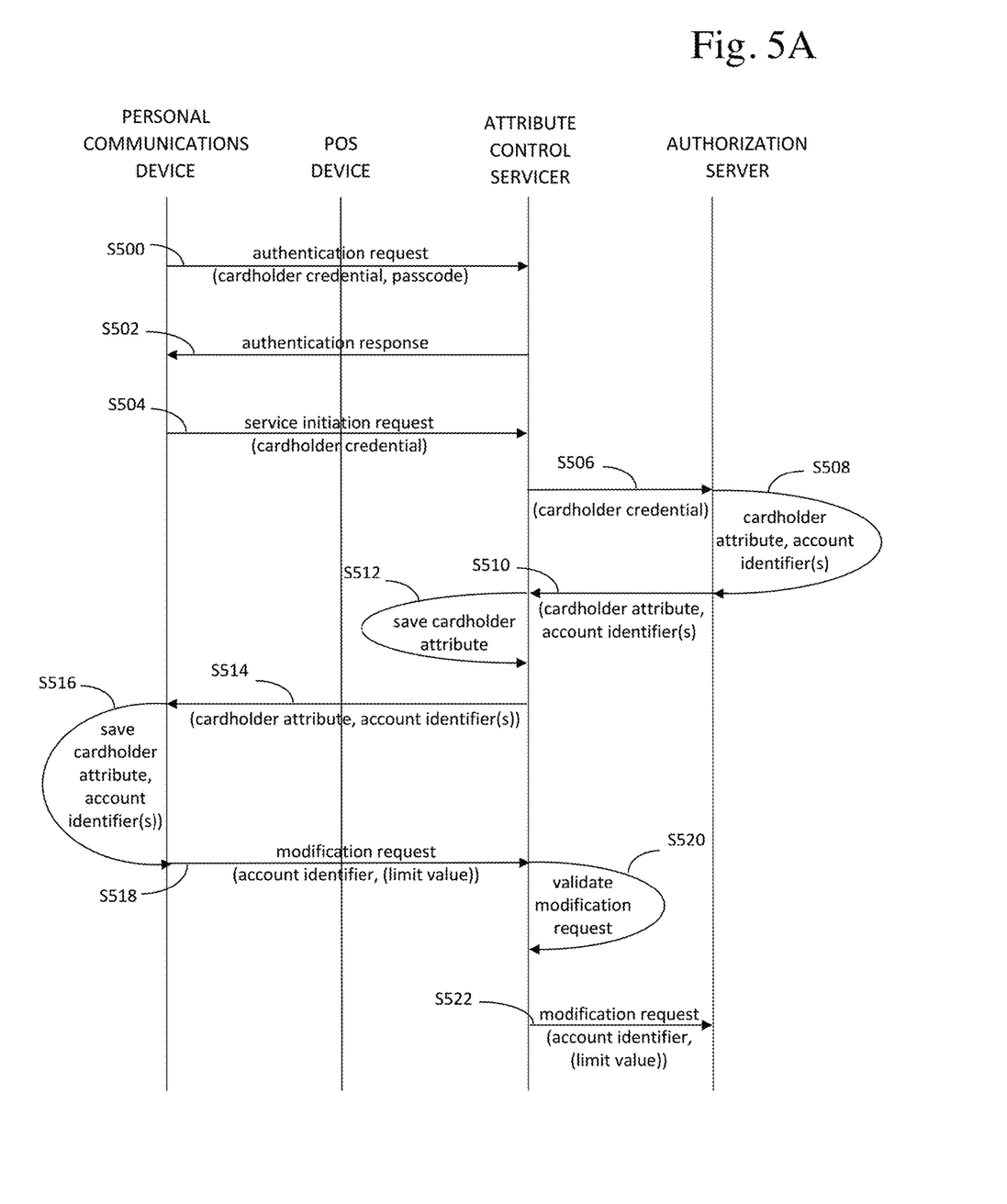
FIGS. 5A and 5B together are a message flow diagram that depicts an exemplary method of validating an authorization request.
Figure 5B:
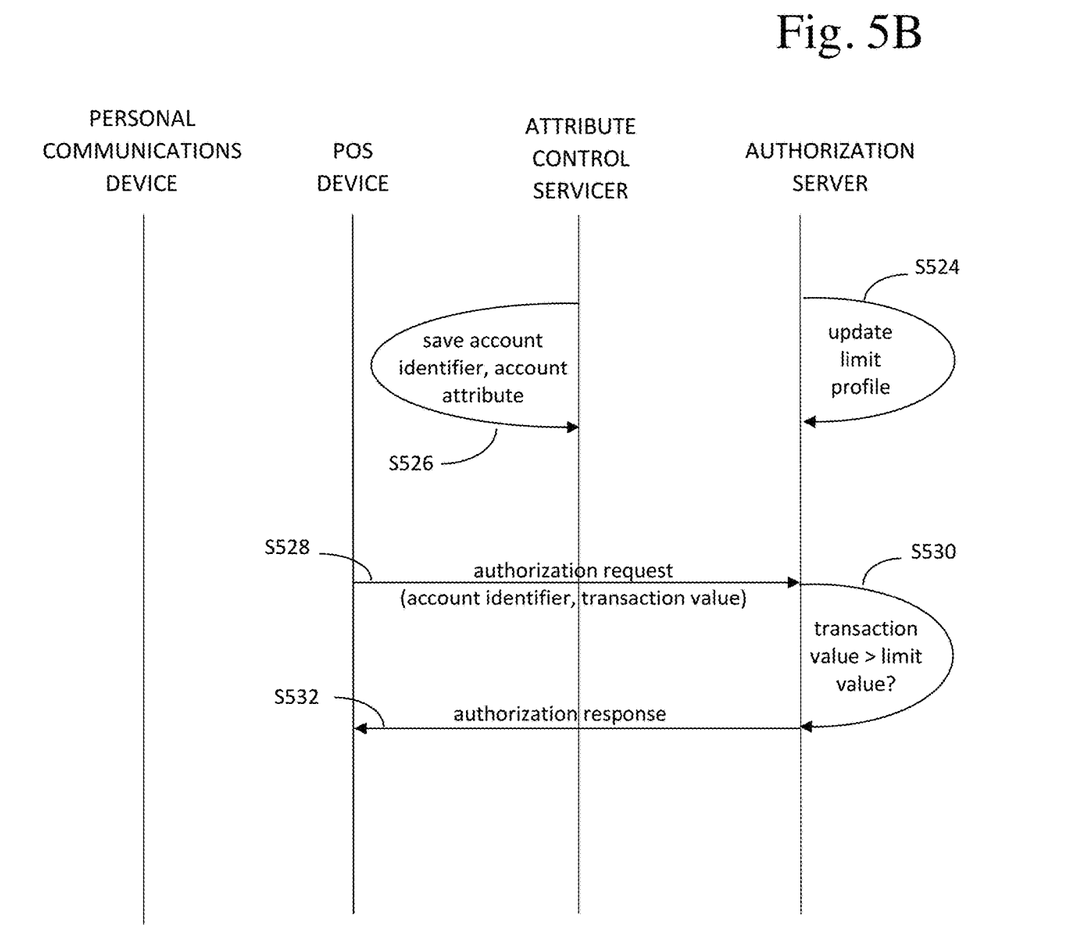

The computer server(s) (i) determine(s) a cardholder attribute from the cardholder credential, (ii) determine(s) an account attribute by querying a card profile database (e.g. card profile database 416) with the account identifier, (iii) validate(s) the modification request by determining whether the cardholder attribute matches the account attribute, and (iv) in accordance with an outcome of the validating, update(s) a limit profile database (e.g. the limit profile database 218) with the modification request. In this embodiment, the card profile database includes at least one record, and one of the records stores the account attribute in association with an account identifier. Further, the limit profile database includes at least one limit profile, and one of the limit profiles stores a per-transaction limit value in association with the account identifier.

In this embodiment, the computer server(s) also receive(s) an authorization request from a POS device (e.g. the POS device 160). The authorization request includes the account identifier and an authorization value. The computer server(s) then (i) determine(s) the per-transaction limit value that is associated with the account identifier by querying the limit profile database with the account identifier, (ii) generate(s) an authorization response, and (iii) transmit(s) the authorization response to the POS device. The authorization response indicates whether the authorization value exceeds the per-transaction limit value.

An example method of validating an authorization request will now be discussed in detail with reference to FIGS. 5A and 5B. In the following example, a merchant is in possession of the POS device 160. The cardholder is in possession of a payment card that is encoded with the account identifier of the cardholder's transaction account. The cardholder is also in possession of the personal communications device 300.

The attribute control server 400 stores (or is in communication with) a secure cardholder authentication database (not shown) that identifies a set of authentication credentials for each cardholder (e.g. the cardholder's unique cardholder credential and the associated passcode). The transactions database 212 identifies the account identifier of the cardholder's transaction account, particulars of financial transactions initiated using the payment card, and the credit (if any) available using the transaction account.

The cardholder database 214 identifies the cardholder's cardholder credential, and indicates whether the cardholder is a primary cardholder or an authorized user. The account profile database 216 identifies the account identifier of the cardholder's transaction account, and the cardholder credential of the primary cardholder and the cardholder credential of the authorized user (if any) of the transaction account.

However, the account identifier has not yet been enrolled in the limit control service 226 (i.e. the limit profile database 218 does not yet include a limit profile that includes the account identifier and an associated per-transaction limit value). Therefore, the card profile database 416 does not yet include a record that includes the account identifier, and the associated account attribute field (that indicates whether the account identifier was caused to be saved in the limit profile database 218 by the primary cardholder or the authorized user). Similarly, the personal communications device 300 is not yet configured with the account table that identifies the account identifier(s) that are associated with the cardholder's cardholder credential in the account profile database 216 and, for each account identifier, the associated authorized user (if any)).

The cardholder attribute database 414 does not yet include a record that includes the cardholder credential, and the associated cardholder attribute that indicates whether the cardholder is a primary cardholder or an authorized user.

Therefore, the personal communications device 300 is not yet configured with the cardholder attribute.

(i) Download Cardholder Attribute and Account Table

Prior to attending at the premises of the merchant, the cardholder uses the personal communications device 300 to configure the personal communications device 300 with the cardholder's cardholder identifier and associated account identifier(s). Before the cardholder initiates configuration of the device, however, the cardholder authenticates to the attribute control server 400 by invoking the card control client 316, and entering the cardholder's cardholder credential and passcode into the card control client 316 of the personal communications device 300. The card control client 316 generates an authentication request (that includes the cardholder credential and passcode) and transmits the authentication request to the attribute control server 400, at step S500.

In response to the authentication request, the attribute control server 400 again authenticates the cardholder with reference to the set of authentication credentials stored in the authentication database. The attribute control server 400 then generates an authentication response that indicates whether the cardholder was successfully authenticated, and transmits the authentication response to the personal communications device 300, at step S502.

The card control client 316 displays the authentication response on the display device 304. If the authentication response indicates that the cardholder was successfully authenticated, the cardholder then initiates configuration of the personal communications device 300 by using the input device 302 to initiate a configuration service with the attribute control server 400. The card control client 316 receives the configuration service request, generates a service initiation request that includes the cardholder credential, and transmits the service initiation request to the attribute control server 400, at step S504.

In response to the service initiation request, the attribute query service 420 of the attribute control server 400 transmits the cardholder credential to the authorization server 200, at step S506.

After the authorization server 200 receives the cardholder credential, at step S508 the cardholder attribute service 222 of the authorization server 200 locates a record in the cardholder database 214 that includes the cardholder credential (e.g. by querying the cardholder database 214 with the cardholder credential), and extracts the cardholder attribute from the cardholder attribute field of the located record.

Similarly, at step S508 the account attribute service 224 of the authorization server 200 locates all the account identifiers that are associated with the cardholder credential in the account profile database 216 (e.g. by querying the primary cardholder field and the authorized user field of the account profile database 216 with the cardholder credential), and generates an account table that includes the located account identifier(s) and identifies, for each located account identifier, the associated authorized user (if any).

The authorization server 200 transmits the cardholder attribute and the account table to the attribute control server 400, at step S510.

After the attribute control server 400 receives the cardholder attribute and the account table, at step S512 the attribute query service 420 saves the cardholder attribute in the cardholder attribute database 414 in association with the cardholder credential.

The attribute query service 420 transmits the cardholder attribute and the account table to the personal communications device 300, at step S514. After the personal communications device 300 receives the cardholder attribute and the account table, at step S516 the card control client 316 saves the cardholder attribute and the account table in the memory 312 of the personal communications device 300.

(ii) Display Account Identifiers

If the cardholder attribute, received from the attribute control server 400, indicates that the cardholder is a primary cardholder, the card control client 316 may prominently display, on the display device 304 (using, for example, bold-faced text), all of the account identifier(s) included in the account table (i.e. the account identifier(s) of the payment card(s) that are assigned to the primary cardholder, and the account identifier(s) of the payment cards that are assigned to the authorized user(s) of the primary cardholder's cardholder subset).

However, if the cardholder attribute indicates that the cardholder is an authorized user, the card control client 316 may locate the account identifier(s) of the payment card(s) that are assigned to that authorized user (e.g. by querying the authorized user field of the account table with the cardholder credential of the authorized user), and may prominently display the located account identifier(s) on the display device 304 (using, for example, bold-faced text). The card control client 316 may also display the remaining account identifier(s) on the display device 304 (using, for example, greyed out text) (i.e. the account identifier(s) of the payment cards that are assigned to the primary cardholder and all other authorized users of the primary cardholder's cardholder subset). As discussed, the "grey-out" text indicates that the attribute control server 400 will not accept a modification request in regards to any such account identifier.

(iii) Enroll Selected Account Identifier in Limit Control Service

After the card control client 316 displays the account identifier(s) on the display device 304, the cardholder selects uses the input device 302 to select one of the account identifiers. In this embodiment, the cardholder also uses the input device 302 to enter a new per-transaction limit value, and to request enrollment of the selected account identifier in the limit control service 226.

The card control client 316 receives the enrollment request, the account identifier and the new limit value, and generates an initialization request message that includes the new per-transaction limit value and the selected account identifier. The card control client 316 then transmits the initialization request message to the attribute control server 400, at step S518.

After the attribute control server 400 receives the initialization request message, at step S520 the attribute control service 422 validates the initialization request message by determining whether the card profile database 416 has a record that includes the account identifier (e.g. by querying the card profile database 416 with the account identifier). If the attribute control service 422 confirms that the card profile database 416 does not have a record that includes the account identifier (i.e. the selected account identifier is not currently enrolled in the limit profile service 226), at step S522 the attribute control service 422 initiates enrollment of the account identifier in the limit profile service 226 by transmitting the initialization request message to the authorization server 200.

After the authorization server 200 receives the initialization request message, at step S524 the limit control service 226 of the authorization server 200 updates the limit profile database 218 with the initialization request message (e.g. by confirming that the limit profile database 218 does not include a limit profile that is associated with the account identifier (included in the initialization request message), creating in the limit profile database 218 a new limit profile that includes the account identifier, and saving the new per-transaction limit value (included in the initialization request message) in the new limit profile in association with the account identifier).

Further, if the attribute control service 422 confirms that the card profile database 416 does not have a record that includes the account identifier, at step S526 the attribute control service 422 creates in the card profile database 416 a new record that includes the account identifier, and saves the account attribute (indicating whether the account identifier was enrolled in the limit profile service 226 by the primary cardholder or the authorized user) in the new record in association with the account identifier.

(iv) Modify Limit Control Service

After the account identifier is enrolled in the limit profile service, the cardholder may use the personal communications device 300 to update/modify the per-transaction limit value associated with the account identifier in the limit profile database 218. Before the cardholder initiates the update service, the cardholder authenticates to the attribute control server 400 by invoking the card control client 316, and entering the cardholder's cardholder credential and passcode into the card control client 316 of the personal communications device 300. The card control client 316 generates an authentication request (that includes the cardholder credential and passcode) and transmits the authentication request to the attribute control server 400, at step S500.

In response to the authentication request, the attribute control server 400 again authenticates the cardholder with reference to the set of authentication credentials stored in the authentication database. The attribute control server 400 then generates an authentication response that indicates whether the cardholder was successfully authenticated, and transmits the authentication response to the personal communications device 300, at step S502.

The card control client 316 displays the authentication response on the display device 304. If the authentication response indicates that the cardholder was successfully authenticated, the cardholder then initiates the update service with the attribute control server 400 by using the input device 302 to select one of the account identifiers, and to request a modification to the limit value associated with the selected account identifier in the limit control service 226. In this embodiment, the cardholder also uses the input device 302 to enter an updated per-transaction limit value.

The card control client 316 receives the modification request, the account identifier and the updated limit value, and generates an update request message that includes the update limit value and the selected account identifier. The card control client 316 then transmits the update request message to the attribute control server 400, at step S518.

After the attribute control server 400 receives the update request message, the attribute control service 422 determines the cardholder attribute that is associated with the cardholder credential (e.g. by querying the cardholder attribute database 414 with the cardholder credential), and determines the account attribute that is associated with the selected account identifier (e.g. by locating, in the card profile database 416, a record that includes the account identifier (included in the update request message), and extracting the account attribute from the account attribute field of the located record).

The attribute control service 422 then validates the update request message, at step S520, by determining whether the cardholder attribute matches the account attribute. If the attribute control service 422 confirms that the cardholder attribute matches the account attribute (i.e. the cardholder enrolled the selected account identifier in the limit profile service), at step S522 the attribute control service 422 initiates the update of the associated limit profile in the limit profile service by transmitting the update request message to the authorization server 200.

However, if the attribute control service 422 is unable to confirm that the cardholder attribute matches the account attribute (i.e. the cardholder did not enroll the selected account identifier in the limit profile service), the attribute control service 422 does not transmit the update request message to the authorization server 200. The attribute control service 422 may, however, notify the card control client 316 that the update request has been denied.

After the authorization server 200 receives the update request message, at step S524 the limit control service 226 of the authorization server 200 updates the limit profile database 218 with the update request message (e.g. by locating the limit profile that is associated with the account identifier (included in the update request message) in the limit profile database 218, and saving the updated per-transaction limit value (included in the update request message) in the located limit profile in association with the account identifier (in replacement of the current limit value).

(v) Cancel Limit Control Service

After the account identifier is enrolled in the limit profile service, the cardholder may use the personal communications device 300 to cancel the limit profile service for an account identifier (i.e. remove the account identifier from the limit profile database 218). Before the cardholder initiates the cancellation service, the cardholder authenticates to the attribute control server 400 by invoking the card control client 316, and entering the cardholder's cardholder credential and passcode into the card control client 316 of the personal communications device 300. The card control client 316 generates an authentication request (that includes the cardholder credential and passcode) and transmits the authentication request to the attribute control server 400, at step S500.

In response to the authentication request, the attribute control server 400 again authenticates the cardholder with reference to the set of authentication credentials stored in the authentication database. The attribute control server 400 then generates an authentication response that indicates whether the cardholder was successfully authenticated, and transmits the authentication response to the personal communications device 300, at step S502.

The card control client 316 displays the authentication response on the display device 304. If the authentication response indicates that the cardholder was successfully authenticated, the cardholder then initiates the cancellation service with the attribute control server 400 by using the input device 302 to select one of the account identifiers, and to request a removal of the selected account identifier from the limit control service 226.

The card control client 316 receives the cancellation request and the account identifier, and generates a cancellation request message that includes the selected account identifier. The card control client 316 then transmits the cancellation request message to the attribute control server 400, at step S518.

After the attribute control server 400 receives the cancellation request message, the attribute control service 422 determines the cardholder attribute that is associated with the cardholder credential (e.g. by querying the cardholder attribute database 414 with the cardholder credential), and determines the account attribute that is associated with the selected account identifier (e.g. by locating, in the card profile database 416, a record that includes the account identifier (included in the update request message), and extracting the account attribute from the account attribute field of the located record).

The attribute control service 422 then validates the update request message, at step S520, by determining whether the cardholder attribute matches the account attribute. If the attribute control service 422 confirms that the cardholder attribute matches the account attribute (i.e. the cardholder enrolled the selected account identifier in the limit profile service), at step S522 the attribute control service 422 initiates the cancellation of the limit profile service for the account identifier by transmitting the cancellation request message to the authorization server 200.

However, if the attribute control service 422 is unable to confirm that the cardholder attribute matches the account attribute (i.e. the cardholder did not enroll the selected account identifier in the limit profile service), the attribute control service 422 does not transmit the cancellation request message to the authorization server 200. The attribute control service 422 may, however, notify the card control client 316 that the cancellation request has been denied.

After the authorization server 200 receives the cancellation request message, at step S524 the limit control service 226 of the authorization server 200 updates the limit profile database 218 with the cancellation request message (e.g. by locating the limit profile that is associated with the account identifier (included in the cancellation request message) in the limit profile database 218, and purging the located limit profile from the limit profile database 218).

Further, if the attribute control service 422 confirms that the cardholder attribute matches the account attribute, at step S526 the attribute control service 422 locates the record that is associated with the account identifier in the card profile database 416, and purges the located record from the card profile database 416.

Since successful completion of the cancellation service causes the account identifier to be removed from the card profile database 416 (and the limit profile database 218), another cardholder can subsequently enroll the same account identifier in the limit profile service (and modify the per-transaction limit value associated with the account identifier in the limit profile database 218).

(vi) Generate Authorization Request

After the account identifier is enrolled in the limit profile service, the cardholder may attend at the premises of a merchant, and may use the merchant's POS device 160 to effect payment for a financial transaction initiated with the merchant. The merchant may input an authorization value (e.g. required payment amount for the financial transaction) into the POS device 160, and the cardholder may initiate payment of the authorization value by interfacing the cardholder's payment card with the POS device 160.

The POS device 160 reads the account identifier from the payment card, and generates an authorization request message that includes at least the merchant identifier of the merchant, the account identifier and the authorization value. The POS device 160 then transmits the authorization request message to the authorization server 200 via the payment network of the wide area network 140, at step S528.

After the authorization server 200 receives the authorization request message from the POS device 160, the authorization server 200 determines whether the authorization request message can be authorized by (i) determining whether the transaction value specified in the authorization request message exceeds the per-transaction limit value associated with the account identifier (if any), and (ii) determining whether the transaction value exceeds the maximum credit available in the associated transaction account.

Therefore, at step S530 the authorization message processor 228 of the authorization server 200 determines the per-transaction limit value (if any) associated with the account identifier (e.g. by querying the limit profile database 218 with the account identifier), and determines whether the authorization value exceeds the per-transaction limit value. If the authorization message processor 228 determines that the financial transaction cannot be authorized because the authorization value exceeds the per-transaction limit value, the authorization message processor 228 may generate an authorization response that indicates that the authorization value exceeded the limit value.

However, if the authorization message processor 228 determines that the authorization value does not exceed the per-transaction limit value, the authorization message processor 228 determines from the account identifier whether the transaction (in an amount equal to the authorization value) can be authorized (i.e. determines from the transactions database 212 whether the credit available in the transaction account associated with the account identifier is at least equal to the authorization value). If the authorization message processor 228 determines that the financial transaction cannot be authorized because the authorization value exceeds the credit available in the transaction account, the authorization message processor 228 may generate an authorization response that indicates that the authorization value exceeded the available credit.

However, if the authorization server 200 determines that the transaction can be authorized, the authorization server 200 updates the transactions database 212 with particulars of the transaction (e.g. merchant, transaction value) and generates an authorization response message indicating that the transaction was authorized. After the authorization server 200 generates the authorization response message, the authorization server 200 transmits the authorization response message to the POS device 160 via the payment network, at step S532.

After the POS device 160 receives the authorization response message from the authorization server 200, the POS device 160 determines from the authorization response message whether the transaction was authorized. If the POS device 160 determines that the transaction was authorized, the POS device 160 notifies the customer that the transaction was authorized. Otherwise, the POS device 160 notifies the customer that the transaction was declined.

The invention claimed is:

1. An authorization control network comprising:
an attribute control server including a first network interface and a first data processing unit, the first data processing unit being in communication with a card profile database, the card profile database including at least one record, one of the records storing an account attribute in association with an account identifier; and
an authorization server including a second network interface and a second data processing unit, the second data processing unit being in communication with a limit profile database, the limit profile database including at least one limit profile, one of the limit profiles storing a current limit value in association with the account identifier, wherein the attribute control server is configured to:
receive a cardholder credential and a modification request from a communications device via the first network interface, the modification request including the account identifier;
determine a cardholder attribute from the cardholder credential;
determine the account attribute by querying the card profile database with the account identifier;
validate the modification request by confirming that the cardholder attribute matches the account attribute; and
transmit the modification request to the authorization server via the first network interface; and wherein the authorization server is configured to:
update the limit profile database with the modification request;
receive an authorization request from a point-of-sale device via the second network interface, the authorization request including the account identifier and an authorization value of a transaction;
determine the current limit value associated with the account identifier by querying the limit profile database with the account identifier;
determine that the authorization value does not exceed the current limit value and does not exceed an available credit amount associated with the account identifier in a transactions database;
generate an authorization response indicating that the transaction was authorized; and
transmit the authorization response to the point-of-sale device via the second network interface.

2. The authorization control network according to claim 1, wherein the modification request includes an updated limit value, and the authorization server is configured to update the limit profile database by saving the updated limit value in the one limit profile in association with the account identifier in replacement of the current limit value.

3. The authorization control network according to claim 1, wherein the modification request includes a cancellation request, and the authorization server is configured to purge the one limit profile from the limit profile database.

4. The authorization control network according to claim 3, wherein the authorization server is configured to purge the one record from the card profile database.

5. The authorization control network according to claim 1, wherein:
the second data processing unit is in communication with a cardholder database, the cardholder database including at least one record, one of the records of the cardholder database storing the cardholder attribute in association with the cardholder credential;
the attribute control server is configured to determine the cardholder attribute by transmitting the cardholder credential to the authorization server; and
the authorization server is configured to:
(i) determine the cardholder attribute by querying the cardholder database with the cardholder credential, and
(ii) transmit the cardholder attribute to the attribute control server.

6. The authorization control network according to claim 1, wherein:
the second data processing unit is in communication with an account profile database, the account profile database including at least one record, one of the records of the account profile database storing the account identifier and the account attribute in association with the cardholder credential;
the attribute control server is configured to:
(i) receive a service initiation request from the communications device, and
(ii) transmit the cardholder credential to the authorization server;
the authorization server is configured to:
(i) determine the account identifier and the account attribute by querying the account profile database with the cardholder credential, and
(ii) transmit the account identifier and the account attribute to the attribute control server; and
the attribute control server is further configured to save the account identifier and the account attribute in the one record of the card profile database.

7. A method of validating an authorization request comprising:
at least one computer server receiving a cardholder credential and a modification request from a communications device, the modification request including an account identifier;
the at least one computer server (i) determining a cardholder attribute from the cardholder credential, (ii) determining an account attribute by querying a card profile database with the account identifier, (iii) validating the modification request by confirming that the cardholder attribute matches the account attribute, and (iv) updating a limit profile database with the modification request, wherein the card profile database includes at least one record, one of the records stores the account attribute in association with the account identifier, the limit profile database includes at least one limit profile, and one of the limit profiles stores a current limit value in association with the account identifier;
the at least one computer server receiving an authorization request from a point-of-sale device, the authorization request including the account identifier and an authorization value of a transaction; and
the at least one computer server (i) determining the current limit value associated with the account identifier by querying the limit profile database with the account identifier, (ii) determining that the authorization value does not exceed the current limit value and does not exceed an available credit amount associated with the account identifier in a transactions database, (iii) generating an authorization response, and (iv) transmitting the authorization response to the point-of-sale device, wherein the authorization response indicates that the transaction was authorized.

8. The method according to claim 7, wherein the modification request includes an updated limit value, and the updating a limit profile database comprises the at least one computer server saving the updated limit value in the one limit profile in association with the account identifier in replacement of the current limit value.

9. The method according to claim 7, wherein the modification request includes a cancellation request, and the updating a limit profile database comprises the at least one computer server purging the one limit profile from the limit profile database.

10. The method according to claim 9, further comprising the at least one computer server purging the one record from the card profile database.

11. The method according to claim 7, wherein the determining the cardholder attribute comprises the at least one computer server querying a cardholder database with the cardholder credential, the cardholder database including at least one cardholder profile, one of the cardholder profiles storing the cardholder attribute and the account identifier in association with the cardholder credential.

12. The method according to claim 7, further comprising, prior to receiving the modification request, the at least one computer server:
  receiving a service initiation request from the communications device;
  determining the account identifier and the account attribute by querying an account profile database with the cardholder credential, the account profile database including at least one record, one of the records of the account profile database storing the account identifier and the account attribute in association with the cardholder credential; and
  saving the account identifier and the account attribute in the one record of the card profile database.

13. A non-transitory computer-readable medium including computer processing instructions stored thereon which, when executed by a processor of a computer server, cause the computer server to:
  receive a cardholder credential and a modification request from a communications device, the modification request including an account identifier;
  determine a cardholder attribute from the cardholder credential;
  determine an account attribute by querying a card profile database with the account identifier, wherein the card profile database includes at least one record, one of the records stores the account attribute in association with the account identifier;
  validate the modification request by confirming that the cardholder attribute matches the account attribute;
  update a limit profile database with the modification request, wherein the limit profile database includes at least one limit profile, and one of the limit profiles stores a current limit value in association with the account identifier;
  receive an authorization request from a point-of-sale device, the authorization request including the account identifier and an authorization value of a transaction;
  determine the current limit value associated with the account identifier by querying the limit profile database with the account identifier;
  determine that the authorization value does not exceed the current limit value and does not exceed an available credit amount associated with the account identifier in a transactions database;
  generate an authorization response that indicates that the transaction was authorized; and
  transmit the authorization response to the point-of-sale device.

14. The computer-readable medium according to claim 13, wherein the modification request includes an updated limit value, and the computer processing instructions cause the computer server to update the limit profile database by saving the updated limit value in the one limit profile in association with the account identifier in replacement of the current limit value.

15. The computer-readable medium according to claim 13, wherein the modification request includes a cancellation request, the computer processing instructions cause the computer server to update the limit profile database by purging the one limit profile from the limit profile database.

16. The computer-readable medium according to claim 15, wherein the computer processing instructions further cause the computer server to purge the one record from the card profile database.

* * * * *